United States Patent

[11] 3,631,780

[72] Inventor Irving Erlichman
 Wayland, Mass.
[21] Appl. No. 845,130
[22] Filed July 28, 1969
[45] Patented Jan. 4, 1972
[73] Assignee Polaroid Corporation
 Cambridge, Mass.

[54] LATCH MECHANISM FOR A FOLDING CAMERA
 8 Claims, 3 Drawing Figs.
[52] U.S. Cl. .................................................. 95/11 R
[51] Int. Cl. .................................................. G03b 19/02
[50] Field of Search .................................................. 95/11 R

[56] References Cited
UNITED STATES PATENTS
654,791 7/1900 Graf .................................. 95/11 R UX

*Primary Examiner*—John M. Horan
*Assistant Examiner*—Kenneth C. Hutchison
*Attorneys*—Brown and Mikulka and Alfred E. Corrigan ABSTRACT: A folding camera including first and second members pivotally coupled to each other for movement between extended and folded positions and an erecting system for guiding such movement. The erecting system includes a pair of links and a rangefinder-viewfinder mounted near one end of each of the links. The rangefinder-viewfinder is provided with a locking mechanism for cooperating with structure on one of the aforementioned members to lock the members and erecting system against relative movement when the camera is in the folded position.

PATENTED JAN 4 1972  3,631,780

INVENTOR.
IRVING ERLICHMAN

BY Brown and Mikulka
and
Alfred E. Corrigan
ATTORNEYS

LATCH MECHANISM FOR A FOLDING CAMERA

The present invention is concerned with improvements in photographic apparatus, e.g., folding cameras of the self-developing type adapted to be employed with a film unit including, for an example, a photosensitive element, a superposed image-receiving element, and a supply of processing liquid adapted to be distributed between the photosensitive and image-receiving elements. The camera includes a plurality of housing members coupled to each other for movement between an extended, operative position in which some of the members cooperate to form sides of an exposure chamber and a folded, inoperative position wherein said members occupy a minimum of space. An erecting system including a rangefinder-viewfinder is coupled to the members for guiding the housing members between the extended and folded positions.

An object of the invention is to provide, in photographic apparatus of the type set forth above, including at least two members coupled for movement between extended and folded positions and an erecting system for guiding the members between said extended and folded positions, means coupled with said erecting system and adapted to cooperate with one of said members for locking said members and said erecting system against relative movement when said members are in the folded position.

Another object of the invention is to provide, in photographic apparatus of the foregoing type, including a plurality of housing members coupled to each other for movement between extended and folded positions and locking means for locking said members in said folded position, means adapted to be grasped by a user's hand for simultaneously moving said locking means to an inoperative position and for moving said members to said extended position.

Still another object of the invention is to construct and arrange the various components of a folding camera including an erecting system and locking apparatus such that they occupy a minimum of space when the camera is in the folded position, thereby increasing the facility by which it may be carried by the user.

Other objects of the invention will in part be obvious and will in part appear hereinafter.

The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
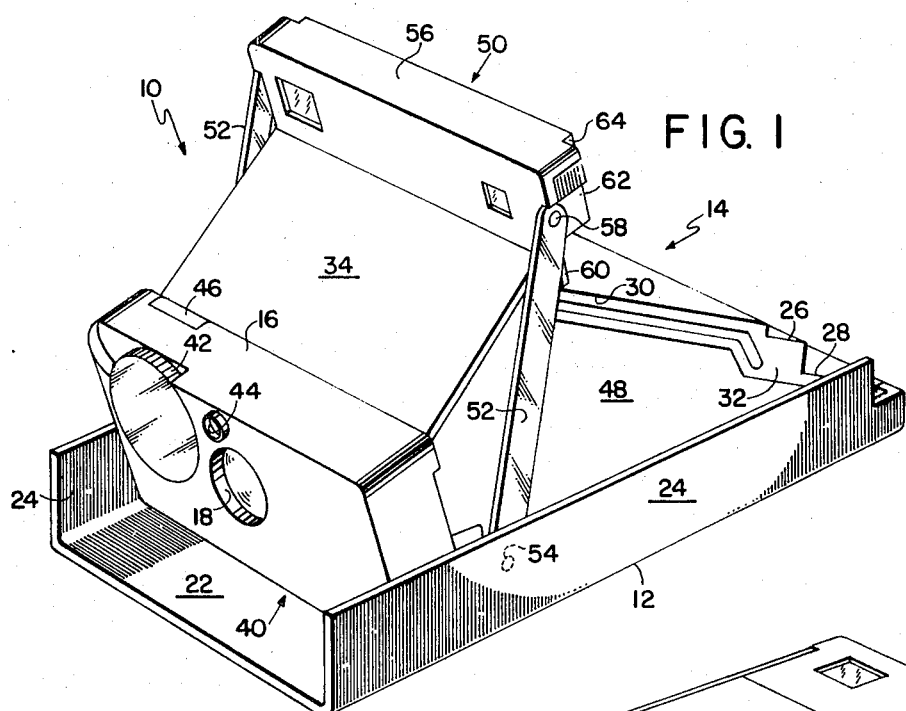
FIG. 1 is a perspective view of a folding camera shown in its extended or operative position.

Reference is now made to the drawing wherein is shown photographic apparatus in the form of a folding camera 10 of the self-developing type. Camera 10 is comprised of a first-housing section or member 12, a second-housing member 14, and a third-housing member 16 incorporating a lens and shutter assembly 18. First-housing member 12, which is pivotally coupled to second-housing member 14 at pivot or hinge 20, is in the form of a relatively thin parallelepipedon and includes a rear wall 22 which functions as a loading door for gaining access to the interior of the camera, parallel sidewalls or flanges 24 and an inner wall (not shown) formed with an exposure opening therein for locating the forwardmost film unit in a film pack or assembly of film units in position for exposure.

Second-housing member 14 supports, on its interior wall, a reflecting surface, e.g., a mirror for directing light from the lens and shutter assembly 18 toward a film unit located within housing member 12 in position for exposure. Housing member 14 includes a pair of recessed portions 26 and 28 located toward the end of member 14 which is pivotally coupled to housing member 12 and a groove 30 running along each sidewall 32 (only one of which is shown), the functions of which will be explained shortly. The end of member 14 remote from pivot 20 is pivotally coupled to a cover member 34 about hinge 36. Cover member 34 is in turn pivotally coupled to housing member 16 at hinge 38.

Figure 2:
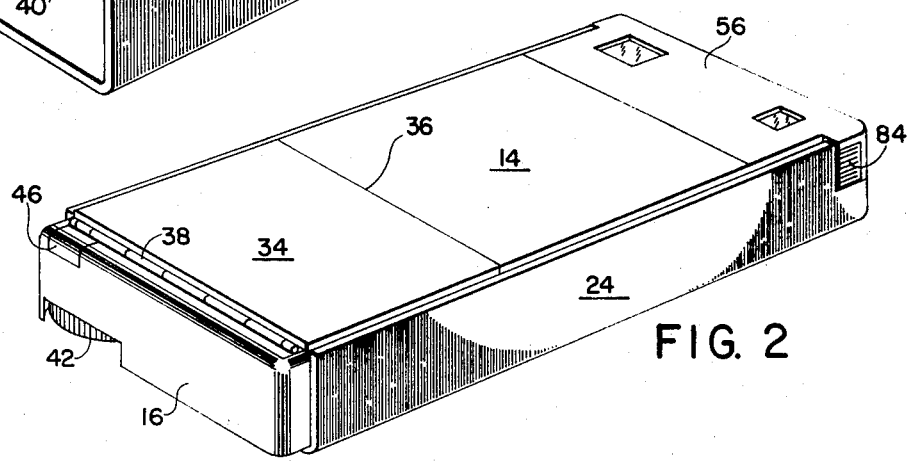
FIG. 2 is a perspective view of the camera depicted in FIG. 1 shown in its folded or inoperative position.

Housing member 16, which is also generally parallelepiped in shape, has a thickness dimension (measured along the optic axis) slightly less than the thickness of housing member 12 and is pivotally mounted between sidewalls 24 for pivotal movement between a folded position as shown in FIG. 2 in which housing member 16 is located between sidewalls 24 and an erect or operative position shown in FIG. 1 in which housing member 16 has been pivoted from the folded position through an angle of less than 90°, e.g., approximately 70° to 75°, with respect to housing member 12. In addition to lens and shutter assembly 18 which includes an adjustable focus objective lens, housing member 16 includes a focusing control 42 and a window 44 for controlling operation of the shutter which is preferably of the automatic photoresponsive type and a shutter release button 46. Housing members 12 and 16 cooperate to define an opening 40 therebetween through which a film unit is adapted to be advanced subsequent to exposure. Housing sections 12, 14 and 16 and cover 34 define four sides of a lighttight exposure chamber which has its two remaining sides closed by a flexible bellows 48.

Erecting means, generally indicated at 50, are provided for guiding and supporting the housing members between and in the extended and folded positions. The erecting means 50 include a pair of links 52 pivotally mounted to an inner frame member of the camera at pivots 54 (only one of which is shown) located on opposite sides of the camera adjacent flanges 24 and a rangefinder-viewfinder 56 pivotally coupled at 58 to the opposite ends of the links. Rangefinder-viewfinder 56 also functions as a force-applying means for transmitting a force to the various housing members to move them between the extended and folded positions. A pin (not shown) mounted on an intermediate portion of each link 52 rides in slot 30 located in each sidewall 32 of housing member 14 to transmit a force from force-applying means 56 to housing member 14 to move the housing members between the extended and folded positions. Rangefinder-viewfinder 56 includes portions 60 and 62 which rest in recesses 26 and 28, respectively, when the camera is in the folded position, thereby enabling the camera to assume a parallelepiped configuration in the folded position. Portion 62 is also indented at 64 to provide a recess in which part of the locking means of the camera will be positioned when the camera is in the folded position. For other details of the camera, reference may be made to my copending application, Ser. No. 763,883, filed Sept. 30, 1968.

In cameras of the foregoing type, it is important that they be securely locked in the folded position. Cameras of the folding type are especially subject to damage when they are in a position between the fully extended and fully closed positions, e.g., one of the erecting links could be inadvertently twisted or bent thereby adversely effecting the entire alignment of the various folding sections. Accordingly, the locking mechanism of the camera must not only maintain the components of the camera in the folded position, but must also be of the type which will reduce to a minimum the possibility of being actuated inadvertently while in a person's suit pocket or carrying case. Further, if the operation of unlocking the locking mechanism and moving the components of the camera to the extended position is to be done in a simple and swift manner, the release for the locking mechanism and the means for moving the various components of the camera to the extended position should be located so that these steps may be performed simultaneously with a minimum of effort. The instant invention is constructed and arranged to incorporate these advantageous features in a simple, efficient and unobvious manner.

Figure 3:
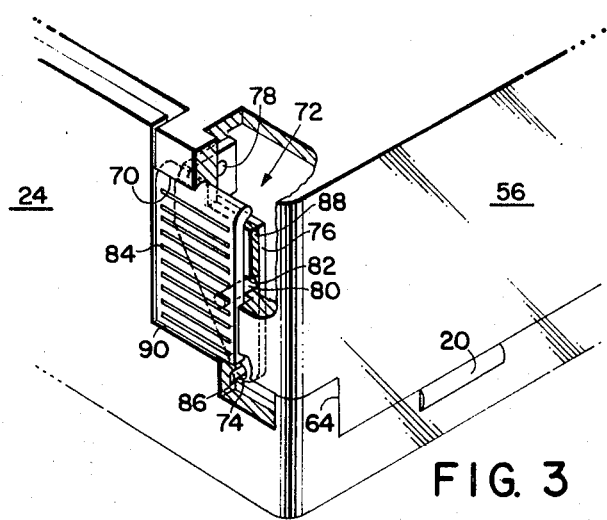
FIG. 3 is an enlarged, fragmentary view, partly in section, of a section of the camera.

Each distal end of rangefinder-viewfinder 56 is provided with a recess 70 for receiving the release means of a locking mechanism indicated generally at 72. Locking mechanism 72 (only one of which will be described because they are identical) includes a locking means 74 in the form of a chamfered detent mounted on a resilient plate 76 which, in turn, is mounted on an internal wall of the rangefinder-viewfinder at 78. A pin 80 is mounted on plate 76 and extends through an opening 82 in the recessed end wall of rangefinder-viewfinder 56. A release means 84 in the form of a plate having a knurled or otherwise suitably roughened surface is attached to the opposite end of pin 80. In the unstressed condition of plate 76, i.e., the folded position of the camera as shown in FIG. 3, release means 84 lies within the recess 70 such that each release means 84 substantially forms a continuation of each flange 24, rather than protruding from the side of the camera where it could be inadvertently actuated. As can be seen in FIG. 3, detent 74 is adapted to enter recess 86 in housing member 12. Release means 84 is spaced a sufficient distance away from the recessed wall 88 to enable detent 74 to be withdrawn from locking engagement with hole 86 when the release means 84 are pushed toward each other. The chamfered edge of detent 74 allows the detent to automatically ride over the edge 90 of housing member 12 when the camera is folded. When it is desired to move the various members of the camera from he folded position shown in FIG. 2 to the extended position shown in FIG. 1, the user merely grasps the force-applying means or rangefinder-viewfinder 56 with the middle three fingers of one hand and, using the remaining thumb and little finger to engage each of the release means 84, simultaneously exerts inward pressure on each of the release means 84 to withdraw detents 74 from their respective recesses 86 and upward pressure on the rangefinder-viewfinder to move the various housing members to the erect position via links 52.

From the foregoing it can be seen that there has been disclosed a novel and efficient means for locking a camera in a folded position with the release means therefor located so as to minimize the possibility of inadvertent actuation and an erecting system coupled to the various sections of the camera and associated with the release means such that the various sections can be simultaneously unlocked and moved to the erect position with a minimum of effort and time. The various components of the folding camera, including the locking and release means and the rangefinder-viewfinder, are structurally correlated with with each other so as to present a thin, compact camera having a parallelepiped configuration when in the folded position, thereby increasing the facility by which it may be carried.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A folding camera including first and second members pivotally coupled to each other for movement between an operative, extended position and a compact, folded position comprising, in combination:

erecting means for supporting and guiding said first and second members between said extended and folded positions, said erecting means including force-applying means adapted to be grasped by a user and moved relative to said first and second members to move said members between said positions;

locking means mounted on said force-applying means and adapted to engage means on one of said first or second members for releasably locking said first and second members in said folded position; and release means mounted on said force-applying means for moving said locking means to an inoperative position, said release means and said force-applying means being positioned adjacent each other so as to be readily grasped by a user's hand for simultaneously moving said locking means to an inoperative position and moving said members to said extended position.

2. A folding camera as defined in claim 1 wherein said erecting means includes link means, said force-applying means being pivotally coupled near one end of said link means, and said locking means being positioned near at least one distal end of said force-applying means.

3. A folding camera including first and second members pivotally coupled to each other for movement between an operative, extended position and a compact, folded position comprising, in combination:

erecting means, including link means, for supporting and guiding said first and second members between said extended and folded positions, said erecting means further including force-applying means pivotally coupled near one end of said link means and having a recess in each distal end thereof, said force-applying means being adapted to be grasped by a user for moving said members between said positions;

locking means mounted on said force-applying means and being positioned near at least one distal end thereof, said locking means being adapted to engage means on one of said first or second members for releasably locking said first and second members in said folded position; and release means mounted on said force-applying means and positioned within each said recess therein for moving said locking means to an inoperative position, said release means and said force-applying means being positioned adjacent each other so as to be readily grasped by a user's hand for simultaneously moving said locking means to an inoperative position and moving said members to said extended position.

4. A folding camera as defined in claim 3 wherein said force-applying means is a rangefinder-viewfinder.

5. A folding camera as defined in claim 4 where said first member includes a pair of parallel flanges for receiving said second section therewithin when said camera is in said folded position and said release means includes portions adapted to be engaged by the user for actuating said locking means, said portions being located substantially in line with said flanges and forming a continuation of said flanges when said camera is in said folded position.

6. A folding camera as defined in claim 5 wherein said locking means is adapted to engage means on said first section for releasably retaining said camera in said folded position.

7. A folding camera as defined in claim 6 wherein said locking means includes a resilient plate mounted on said force-applying means and chamfered detent means attached to said plate for automatically engaging means on said first member as said first and second members are moved toward said folded position for releasably locking said first and second members in said folded position.

8. A folding camera as defined in claim 7 wherein the configuration of said camera in said folded position is substantially parallelepiped.

* * * * *